Jan. 16, 1934. B. A. SWENNES 1,943,849
ENGINE MOUNTING
Original Filed Dec. 26, 1931 2 Sheets-Sheet 1
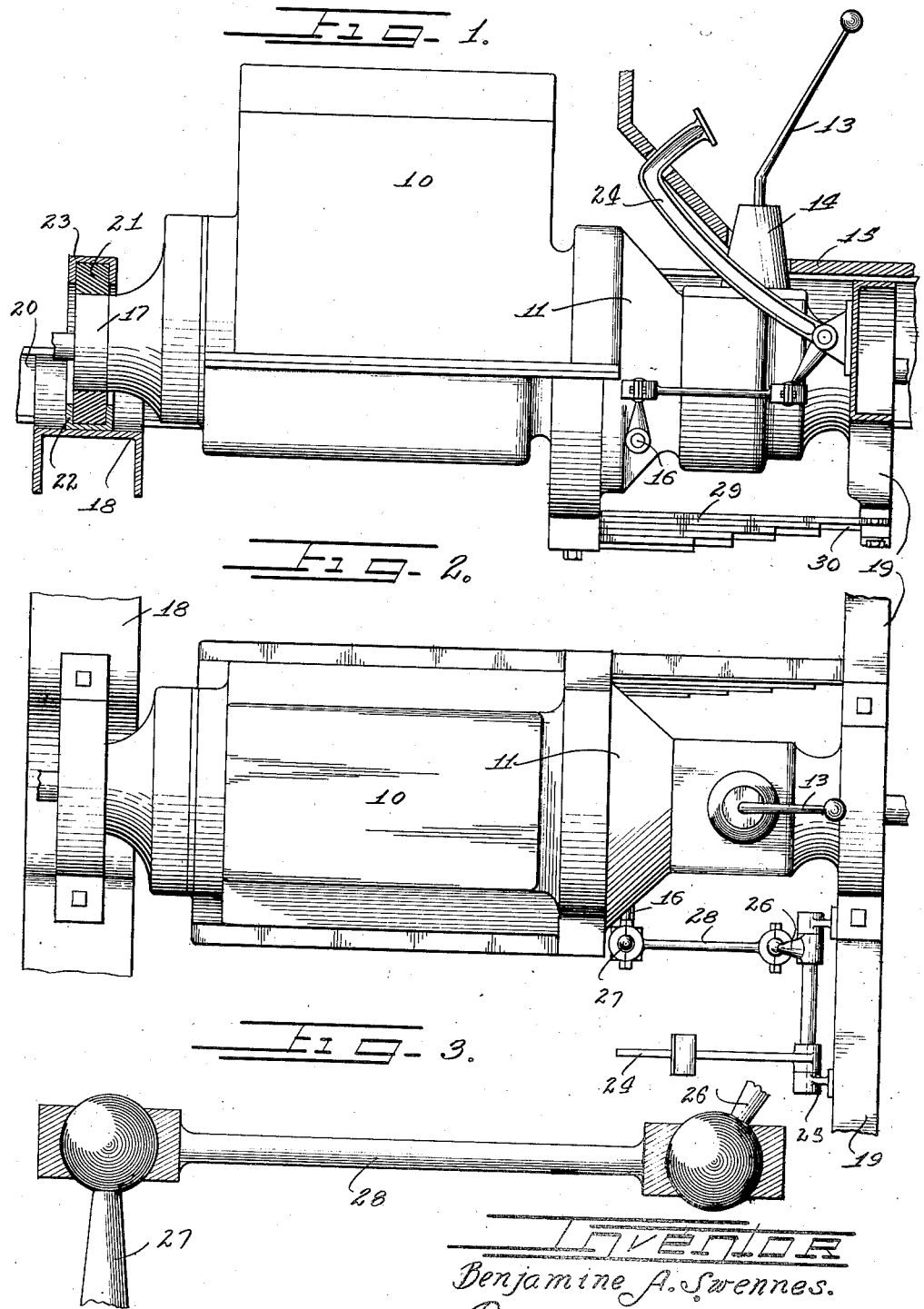

Jan. 16, 1934.  B. A. SWENNES  1,943,849
ENGINE MOUNTING
Original Filed Dec. 26, 1931  2 Sheets-Sheet 2
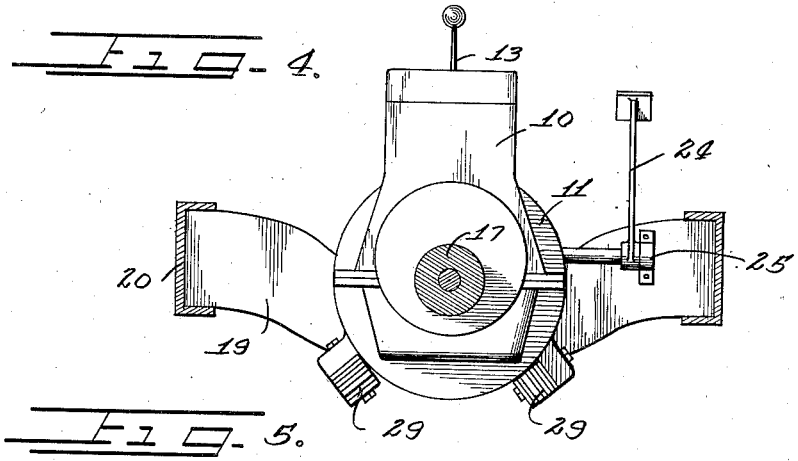
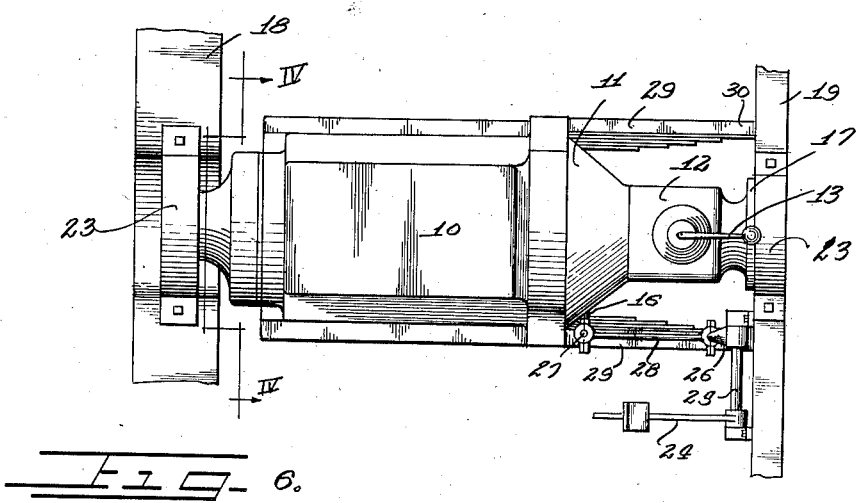
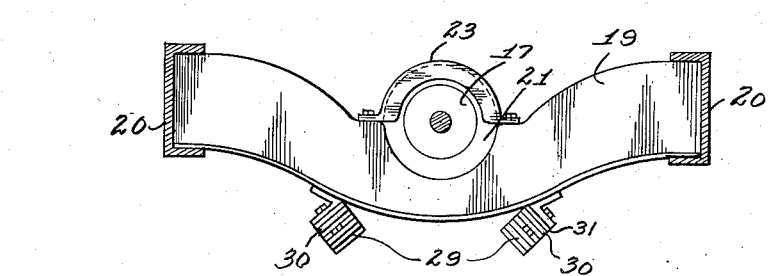

Patented Jan. 16, 1934

1,943,849

UNITED STATES PATENT OFFICE 1,943,849

ENGINE MOUNTING

Benjamin A. Swennes, Rockford, Ill., assignor to Borg-Warner Corporation, Chicago, Ill., a corporation of Illinois Application December 26, 1931, Serial No. 583,315
Renewed June 5, 1933

5 Claims. (Cl. 180—64)

This invention relates to improvements in an engine mounting for the engine of automotive installations and more particularly to an engine mounting wherein a vehicle frame and chassis are insulated from periodic vibrations and torque reactions set up in the engine and its associated transmission.

I am aware it has been proposed heretofore to resiliently mount an engine and its associated transmission, conveniently referred to as an engine unit, on rubber blocks or the like at three or more points on the frame, but such mountings have generally failed to satisfactorily absorb both vibrations and torque reaction throughout the operating range. I am also aware that it has heretofore been proposed to mount the engine for oscillation about a longitudinal axis in order to be able to resiliently absorb the torque reaction, and it is an important object of this invention to provide improved stabilizing means for absorbing the torque reaction by resiliently opposing a rotary or oscillatory movement of the engine unit about a longitudinal axis, the stabilizing means being disposed in parallel longitudinal arrangement with a longitudinally rigid pivoted connection between the engine unit and a clutch operating pedal carried by the vehicle frame, arranged so that the stabilizer means will so restrain the movement of the engine unit as to prevent the transmission of engine unit movements back to the clutch pedal, to the annoyance of the driver.

It is also an object of this invention to provide an engine unit mounting wherein the engine unit is pivotally and resiliently mounted on the frame at the front and rear thereof substantially in the longitudinal axis, the front and rear mountings resiliently permitting a limited longitudinal as well as transverse movement, the latter being especially important as I have found that the resultant forces of torque reaction combined with unbalance of the reciprocating parts or forces tend to create an oscillatory or orbitary movement of the engine about its normal crankshaft axis which, if resiliently restrained by a non-resonant yielding mounting, can be prevented from transmitting such forces to the vehicle frame in the form of apparent lateral and vertical vibrations most evident as a "shimmy" effect in the radiator, hood, and/or front fenders of a vehicle at engine periodicities corresponding to the natural periods of the affected parts. A correlated object of this invention is to provide a mounting of the class described wherein the resilient non-metallic mounting means can be so chosen in physical characteristics as to have an effective dampening action at worst natural periods of vibration of the engine unit.

It is a further object of this invention to provide an improved clutch control mechanism for use with engine units subject to angular and orbital movements about a longitudinal axis.

Other and further objects of this invention will be apparent from the disclosures in the specification and the accompanying drawings.

This invention (in a preferred form) is illustrated in the drawings and hereinafter more fully described.

On the drawings:

Figure 1 is a longitudinal elevation of an engine and transmission unit mounted in a vehicle frame, the latter being partly broken away or sectioned for convenience.

Figure 2 is a plan view of the engine unit mounting.

Figure 3 is an end detail section of the linkage between the clutch pedal and the engine unit.

Figure 4 is a cross section on the line IV—IV of Figure 5 showing a front elevation of the engine unit.

Figure 5 is a plan view of an engine unit showing a slightly modified form of stabilizer arrangement.

Figure 6 is a rear elevation of the frame cross member at the rear of the engine unit of Figure 5.

As shown on the drawings:

A conventional power plant unit for automotive vehicles has been chosen for illustrative purposes although it is to be understood that my engine mounting is equally applicable to marine and other installations of like character. The unit as shown comprises an engine, designated as a whole by the numeral 10, which engine is provided with a bell housing 11 enclosing the usual flywheel and clutch, together with an attached transmission casing 12 controlled by a conventional gear shift lever 13 mounted in a tower 14 which projects up through the floor boards 15 of a vehicle body. A conventional clutch operating shaft 16 is shown projecting from the side of the bell housing 11.

The engine unit so described is provided with mounting surfaces 17 preferably but not necessarily concentric with the crankshaft axis said mounting surfaces being located in front of the engine and in rear of the transmission, respectively, above frame cross members 18 and 19 connecting the side rails 20 of the chassis frame. These mounting surfaces are preferably cylindrical bearings but may have a somewhat spherical shape if desired. Rings 21 of resilient, non-resonant (and preferably non-metallic) material, such as rubber, envelop the mounting surfaces, the lower part of the rings seating in a lower retainer 22 in a suitable well in the cross members and upper retainers 23 are applied thereto and bolted down onto the cross members. The assembly may conveniently be so proportioned as to apply an initial pressure to the ring 21 in order to pre-load the same either to compensate for deflection due to the engine weight or to provide any desired initial resistance to engine movements. Such preloading also permits an adjustment to meet varying engine vibration periods. The bearing rings 21 are intended to permit pivotal movement of the engine unit about a longitudinal axis, together with a limited orbital or radial movement in a transverse vertical plane at approximate right angles to the longitudinal axis.

Because of the substantial rotational or oscillatory movements of the powerplant about its longitudinal axis it is impractical to mount the usual clutch lever 24 directly on the clutch shaft 16 since the pedal end of the lever would then magnify the engine movements due to the leverage thereof and thus cause annoyance and discomfort to the driver. The clutch pedal is accordingly mounted on a shaft 25 journaled on the front side of the rear frame cross member 19, this shaft carrying a ball ended lever 26 connected to a similar lever 27 on the clutch shaft by a rod 28, the levers being so disposed that the tie rod lies substantially parallel to the pivotal axis of the engine, as such an arrangement, in connection with a similar disposition of a stabilizer, to be hereinafter described, assures the minimum effect of engine movements on the clutch pedal.

Because of the pivotal mounting of the power plant about a longitudinal axis it is necessary to provide means for absorbing torque reactions and other forces tending to rotate the power plant about its mounting axis, and thereafter restoring the power plant to its original vertical position. To this end I provide a cantilever torque reaction spring stabilizer 29 mounted on the engine and having its free end 30 bolted to the frame cross member 19 between a pair of rubber blocks 31, which latter are provided to prevent the direct transmission of vibrations from the engine to the frame cross member. As shown in Figures 1 and 2 a single multiple leaf spring 29 is used to build up the restoring force in proportion to the angular displacement of the engine, while in Figures 4, 5 and 6 two duplicate springs 29 are used which are preferably arranged in opposition to each other so that one opposes the torque reaction and the other the rebound forces. In either case the torque stabilizer is mounted substantially parallel to the pivotal axis of the power plant and at approximately the same radial distance therefrom as the clutch tie rod 28, as such an arrangement gives a practically parallel motion of the stabilizer and the tie-rod whereby the stabilizer modifies the motion of the engine in such a manner as to cause the engine end of the tie rod to traverse an arc having a center at approximately the point of the clutch lever 26 thus leaving the clutch operating parts on the frame substantially undisturbed during transverse engine movements.

In the operation of the engine mounting, stabilizing, and operating connections of this invention, the firing impulses and side wall pressures resulting from connecting rod angularity normally create a torque reaction, tending to twist the engine about a longitudinal axis, as well as setting up vertical and transverse vibrations in the power plant. The cushioned pivotal mountings absorb the vibrations and permit a rotation of the power plant about the pivotal axis, the combination of forces producing a fairly well defined orbital movement at the front mounting which is nearer the engine forces. The torque reaction, as well as some of the engine vibration, is absorbed by a resilient stabilizing connection to the chassis frame in the case of a vehicle and by disposing this connection parallel to the pivotal axis and providing a clutch connection in a similar position the transverse engine movement is modified by the stabilizer to more nearly conform to the arc of the clutch connection thus preventing the transmission and magnification of engine movements at the clutch pedal.

It will thus be seen that I have invented an improved torque reaction mounting and clutch control that will be simple and relatively inexpensive to manufacture and assemble and that will not transmit annoying motion and vibration to the operating controls adjacent the driver's position.

I claim:

1. A power plant mounting for automotive purposes comprising front and rear pivotal mountings on the supporting frame said mountings being disposed in substantially the central longitudinal axis of the power plant whereby the latter is free to pivot about said longitudinal axis in response to torque reactions, resilient stabilizing means connecting the power plant to the supporting frame and adapted to stabilize and resist such pivotal movements of the power plant, said stabilizing means being disposed in parallel relationship to the pivotal axis of the power plant, a clutch operating member carried by the supporting frame, and means connecting said clutch operating member to the power plant, said connecting means being disposed parallel to the stabilizing means.

2. A power plant mounting for automotive purposes comprising front and rear resilient pivotal mountings on the supporting frame said mountings being disposed in substantially the central longitudinal axis of the power plant whereby the latter is free to pivot about said longitudinal axis in response to torque reactions, and is cushioned against transmission of engine vibrations to the supporting frame, resilient stabilizing means connecting the power plant to the supporting frame and adapted to stabilize and resist such pivotal movements of the power plant, said stabilizing means being disposed in parallel relationship to the pivotal axis of the power plant, a clutch operating member carried by the supporting frame, and means connecting said clutch operating member to the power plant, said connecting means being disposed parallel to the stabilizing means.

3. In combination, a supporting frame, a power plant mounting thereon for cushioned and pivotal movement about a longitudinal axis of said power plant, a clutch operating member supported on said frame, a pivoted connection from said member to the power plant, said connection being disposed substantially parallel to the longitudinal axis about which the power plant is pivoted, and torque reaction stabilizing means connected between the power plant and the frame and disposed parallel to the clutch connection.

4. In combination, a supporting frame, a power plant mounting thereon for pivotal movement about a longitudinal axis of said power plant, a clutch operating member supported on said frame, a pivoted connection from said member to the power plant, said connection being disposed substantially parallel to the longitudinal axis about which the power plant is pivoted, and torque reaction stabilizing means connected between the power plant and the frame and disposed parallel to the clutch connection, and at a substantially equal radial distance from the pivotal axis.

5. In combination with a power plant pivotally mounted to a frame about a longitudinal axis of the power plant, stabilizing means for controlling pivotal movements of the power plant relative to the frame, said stabilizing means being disposed substantially parallel to the axis about which the power plant is pivoted, and clutch operating means including a tie rod so arranged as to have a movement substantially similar in range to that of the stabilizing means whereby the stabilizer means and the tie rod will operate in parallel.

BENJAMIN A. SWENNES.